US010919144B2

(12) United States Patent
Sinnet et al.

(10) Patent No.: US 10,919,144 B2
(45) Date of Patent: Feb. 16, 2021

(54) MULTI-SENSOR ARRAY INCLUDING AN IR CAMERA AS PART OF AN AUTOMATED KITCHEN ASSISTANT SYSTEM FOR RECOGNIZING AND PREPARING FOOD AND RELATED METHODS

(71) Applicant: Miso Robotics, Inc., Pasadena, CA (US)

(72) Inventors: Ryan W. Sinnet, Pasadena, CA (US); Robert Anderson, Pasadena, CA (US); Zachary Zweig Vinegar, Los Angeles, CA (US); William Werst, Pasadena, CA (US); David Zito, Pasadena, CA (US); Sean Olson, Pacific Palisades, CA (US)

(73) Assignee: Miso Robotics, Inc., Pasadena, CA (US)

( * ) Notice: Subject to any disclaimer, the term of this patent is extended or adjusted under 35 U.S.C. 154(b) by 41 days.

(21) Appl. No.: 16/100,889

(22) Filed: Aug. 10, 2018

(65) Prior Publication Data
US 2018/0345485 A1 Dec. 6, 2018

Related U.S. Application Data

(63) Continuation-in-part of application No. PCT/US2018/021066, filed on Mar. 6, 2018, and a
(Continued)

(51) Int. Cl.
*G06K 9/00* (2006.01)
*B25J 9/00* (2006.01)
(Continued)

(52) U.S. Cl.
CPC ............. *B25J 9/0081* (2013.01); *A23L 5/10* (2016.08); *A23L 5/15* (2016.08); *A47J 36/32* (2013.01);
(Continued)

(58) Field of Classification Search
None
See application file for complete search history.

(56) References Cited

U.S. PATENT DOCUMENTS 4,919,950 A 4/1990 Mak
4,922,435 A 5/1990 Cahlander et al.
(Continued)

FOREIGN PATENT DOCUMENTS

JP 2009106734 A 5/2009
WO 0170087 A2 9/2001
(Continued)

OTHER PUBLICATIONS

B. Siciliano & O. Khatib, Handbook of Robotics, published by Springer-Verlag Berlin (2008).
(Continued)

*Primary Examiner* — Hadi Akhavannik
(74) *Attorney, Agent, or Firm* — Richard Batt

(57) ABSTRACT

An automated kitchen assistant system inspects a food preparation area in the kitchen environment using a novel sensor combination. The combination of sensors includes an Infrared (IR) camera that generates IR image data and at least one secondary sensor that generates secondary image data. The IR image data and secondary image data are processed to obtain combined image data. A trained convolutional neural network is employed to automatically compute an output based on the combined image data. The output includes information about the identity and the location of the food item. The output may further be utilized to command a robotic arm, kitchen worker, or otherwise assist in food preparation. Related methods are also described.

26 Claims, 10 Drawing Sheets

Related U.S. Application Data continuation-in-part of application No. PCT/US2018/020948, filed on Mar. 5, 2018.

(60) Provisional application No. 62/592,130, filed on Nov. 29, 2017, provisional application No. 62/467,743, filed on Mar. 6, 2017, provisional application No. 62/467,735, filed on Mar. 6, 2017.

(51) Int. Cl.
| | | |
|---|---|---|
| G05B 19/42 | (2006.01) | |
| A23L 5/10 | (2016.01) | |
| G06Q 50/12 | (2012.01) | |
| G06K 9/62 | (2006.01) | |
| G06Q 10/06 | (2012.01) | |
| G06T 7/73 | (2017.01) | |
| G06T 7/70 | (2017.01) | |
| A47J 36/32 | (2006.01) | |
| A47J 37/06 | (2006.01) | |
| A47J 37/12 | (2006.01) | |

(52) U.S. Cl.
CPC .............. *A47J 37/06* (2013.01); *A47J 37/12* (2013.01); *G05B 19/42* (2013.01); *G06K 9/00771* (2013.01); *G06K 9/6273* (2013.01); *G06Q 10/06311* (2013.01); *G06Q 50/12* (2013.01); *G06T 7/70* (2017.01); *G06T 7/73* (2017.01); *A23V 2002/00* (2013.01); *G05B 2219/36184* (2013.01); *G05B 2219/40391* (2013.01); *G06K 2209/17* (2013.01); *G06T 2207/10024* (2013.01); *G06T 2207/10028* (2013.01); *G06T 2207/10048* (2013.01); *G06T 2207/20084* (2013.01)

(56) References Cited

U.S. PATENT DOCUMENTS

| | | | |
|---|---|---|---|
| 5,285,604 A | 2/1994 | Carlin | |
| 5,386,762 A | 2/1995 | Gokey | |
| 5,389,764 A | 2/1995 | Nishii et al. | |
| 5,833,295 A | 11/1998 | Farlow, Jr. | |
| 5,893,051 A | 4/1999 | Tomohiro | |
| 7,174,830 B1 | 2/2007 | Dong | |
| 7,920,962 B2 | 4/2011 | D et al. | |
| 7,971,450 B2 | 7/2011 | Furlanetto et al. | |
| 8,276,505 B2 | 10/2012 | Buehler et al. | |
| 8,610,037 B2 | 12/2013 | Polt | |
| 8,820,313 B1 | 9/2014 | Lutes | |
| 9,285,589 B2 | 3/2016 | Osterhout et al. | |
| 9,483,875 B2 | 11/2016 | Theimer et al. | |
| 9,542,621 B2 | 1/2017 | He et al. | |
| 9,785,911 B2 | 10/2017 | Galluzzo et al. | |
| 9,815,191 B2 | 11/2017 | Oleynik et al. | |
| 10,112,771 B2 | 10/2018 | D'andrea et al. | |
| 10,154,756 B2 | 12/2018 | Hall et al. | |
| 10,293,488 B2 | 5/2019 | Hall et al. | |
| 2004/0111321 A1* | 6/2004 | Kargman | G06Q 20/20 705/16 |
| 2005/0193901 A1 | 9/2005 | Buehler | |
| 2008/0110347 A1 | 5/2008 | Wong | |
| 2013/0033057 A1 | 2/2013 | Markham | |
| 2013/0302483 A1* | 11/2013 | Riefenstein | H05B 6/6447 426/233 |
| 2014/0157698 A1 | 6/2014 | Cihak et al. | |
| 2014/0203012 A1 | 7/2014 | Corona et al. | |
| 2014/0324607 A1 | 10/2014 | Frehn et al. | |
| 2014/0334691 A1 | 11/2014 | Cho et al. | |
| 2014/0363266 A1 | 12/2014 | Cooper | |
| 2015/0290795 A1* | 10/2015 | Oleynik | B25J 9/0081 700/257 |
| 2016/0180546 A1* | 6/2016 | Kim | G06T 7/251 382/103 |
| 2016/0239705 A1 | 8/2016 | Masood et al. | |
| 2016/0327279 A1 | 11/2016 | Bhogal et al. | |
| 2016/0327281 A1* | 11/2016 | Bhogal | H05B 1/0263 |
| 2017/0011319 A1 | 1/2017 | Elliot et al. | |
| 2017/0130968 A1 | 5/2017 | Nagraj et al. | |
| 2017/0169315 A1 | 6/2017 | Vaca et al. | |
| 2017/0206431 A1 | 7/2017 | Sun et al. | |
| 2017/0252922 A1 | 9/2017 | Levine et al. | |
| 2017/0348854 A1 | 12/2017 | Oleynik | |
| 2018/0345485 A1 | 12/2018 | Sinnet et al. | |
| 2020/0046168 A1 | 2/2020 | Sinnet et al. | |
| 2020/0047349 A1 | 2/2020 | Sinnet et al. | |

FOREIGN PATENT DOCUMENTS

| | | |
|---|---|---|
| WO | 2006006624 A1 | 1/2006 |
| WO | 2012020858 A1 | 2/2012 |
| WO | 2015100958 A1 | 7/2015 |
| WO | 2015143800 A1 | 10/2015 |
| WO | 2016040361 A1 | 3/2016 |
| WO | 2015125017 A3 | 6/2016 |
| WO | 2017114014 A1 | 7/2017 |
| WO | 2017103682 A3 | 8/2017 |
| WO | 2018031489 A1 | 2/2018 |

OTHER PUBLICATIONS

Beucher, Serge, and Fernand Meyer. "The morphological approach to segmentation: the watershed transformation." Optical Engineering—New Yark-Marcel Dekker Incorporated—34 (1992): 433-433.

Bonanni et al., "Counterintelligence: Augmented Reality Kitchen", CHI 2005, (Apr. 2, 2005), URL: http://citeseerx.ist.psu.edu/viewdoc/summary?doi=10.1.1.88.2875, (Jun. 12, 2018), XP055559956.

International Preliminary Examination Report dated Jul. 11, 2018 for PCT/US2018/020948.

International Preliminary Examination Report dated Jul. 20, 2018 for PCT/US2018/021066.

Ju Yong Chang, Haesol Park, In Kyu Park, Kyoung Mu Lee, Sang Uk Lee, GPU-friendly multi-view stereo reconstruction using surfel representation and graph cuts, Computer Vision and Image Understanding, vol. 115, Issue 5, 2011, pp. 620-634.

Kaiming He, Georgia Gkioxari, Piotr Dollar, and Ross B. Girshick, Mask R-CNN, arXiv, 2017.

Krystal B., The magic of Eatsa, explained, (Mar. 2, 2017), URL: https://www.washingtonpost.com/...017/03/02/57c95fb0-f55a-11e6-b9c9-e83fce42fb61_story.h tml?horedirect=on&utm_term=.108e357d67 df, (May 21, 2018).

Lucas, Bruce D., and Takeo Kanade. "An iterative image registration technique with an application to stereo vision." (1981): 674-679.

Ohta, Yu-Ichi, Takeo Kanade, and Toshiyuki Sakai. "Color information for region segmentation." Computer graphics and image processing 13.3 (1980): 222-241.

Shaoqing Ren, Kaiming He, Ross Girshick, and Jian Sun, "Faster R-CNN: Towards Real-Time Object Detection with Region Proposal Networks Faster", IEEE Transactions on Pattern Analysis and Machine Intelligence, vol. 39 Issue 6, Jun. 2017.

* cited by examiner

MULTI-SENSOR ARRAY INCLUDING AN IR CAMERA AS PART OF AN AUTOMATED KITCHEN ASSISTANT SYSTEM FOR RECOGNIZING AND PREPARING FOOD AND RELATED METHODS

CROSS-REFERENCE TO RELATED APPLICATIONS

This claims the benefit of provisional application No. 62/592,130, filed Nov. 29, 2017, and entitled "AN INFRA-RED-BASED AUTOMATED KITCHEN ASSISTANT SYSTEM FOR RECOGNIZING AND PREPARING FOOD AND RELATED METHODS." This is also a continuation in part application of application No. PCT/US18/21066, filed Mar. 6, 2018, entitled "ROBOTIC KITCHEN ASSISTANT FOR PREPARING FOOD ITEMS IN A COMMERCIAL KITCHEN AND RELATED METHODS", and a continuation in part application of application no. PCT/US18/20948, filed Mar. 5, 2018, entitled "AUGMENTED REALITY-ENHANCED FOOD PREPARATION SYSTEM AND RELATED METHODS."

BACKGROUND OF THE INVENTION

This invention relates to kitchen apparatuses to prepare food, and in particular to infrared-based sensor arrays and apparatuses for automatically recognizing and cooking food in a kitchen environment.

Providing a robust and effective apparatus to prepare food for consumers is challenging because of the wide variety of types of food, cooking techniques, kitchen appliances, kitchen tools, and utensils.

Additionally, food preparation is often labor intensive and subject to human error. Workers employed by these businesses require careful and sometimes excessive training to accurately and safely prepare the food, thus increasing costs. It follows that businesses that prepare and sell food typically have high labor costs and experience large amounts of monetary and food loss as well as customer dissatisfaction due to human error.

Various commercial food preparation equipment addresses some of the above-mentioned challenges.

An example of one type of food preparation equipment is a clamshell-type grill, a device to grill both sides of food items simultaneously, typically in large batches. The resulting cooked food items are then typically placed into a warming drawer prior to serving. A commercial example of this device is the ProGrill SL1557P, manufactured by the ProLuxe Company (Perris, Calif.).

Another example of food preparation equipment is a conveyor fryer for French fries and other foods that are cooked using a frying process. The conveyor serves to benefit the cooking process by removing human error associated with timing, thereby improving consistency and throughput. This device generally comprises a large vat of oil that is heated and a system of mesh screens attached to a conveyor belt that move food items through the oil at a predetermined rate. Fried food items are then dispensed at the other end of the device. Kitchen workers place uncooked items into one side and retrieve cooked items on the other side. A commercial example of this device is the MasterMatic Compact Fryer, Model 350, manufactured by the Heat and Control Company (Hayward, Calif.).

The above described food preparation equipment, however, has multiple limitations. For example, such equipment is limited to only one type of food. A clamshell grill, for instance, does not allow food items to be cooked to different levels in a single batch. Similarly, a conveyor-type fryer, can only be configured for cooking one type of item at a time as the cooking time is set by the speed of the conveyor belt. Consequently, it cannot be used to prepare more than one type of food unless the different types of food happen to have the same cooking time requirements.

Second, such food preparation equipment typically requires batch preparation of food items. For example, clamshell grills are typically designed to prepare multiple food items in batches and are not useful for preparing items individually.

Third, the increased mechanical and/or electrical complexity inherent in such devices often leads to increased failure rates versus conventional, non-automated versions of such devices, resulting in higher downtimes. Such downtimes can be especially costly for restaurants because restaurants do not typically have back-up equipment onsite and consequently they may not be able to cook a number of items on their menu which reduces average order size or even drives away potential customers.

Fourth, such food preparation equipment typically has a large footprint compared to conventional versions of the equipment and for the variety of items they are capable of cooking. This larger size is a challenge for restaurant owners because of the high cost of kitchen space. For example, the above mentioned MasterMatic fryer is substantially larger than a similar model without the automatic conveyor.

Fifth, the potential benefits of such food preparation equipment are often outweighed by their associated upfront costs. For example, automated frying equipment is significantly more expensive than conventional frying equipment.

Sixth, such food preparation equipment still requires extensive involvement of kitchen workers.

These drawbacks present significant challenges to restaurant operators and are not consistent with consumer preferences for a wide variety of freshly cooked food and a restaurant's need for high reliability.

Other food preparation equipment addresses some of the above-mentioned challenges. For example, U.S. Pat. No. 5,389,764 to Nishii et al. (the '764 Patent) describes a cooking appliance that controls a cooking device on the basis of temperature information of an object to be cooked that is estimated from changes in physical characteristics. A neural network is taught, for a number of categories of food that are classified according to the temperature of the cooked and completed food, the relationship between changes in the physical characteristic, such as the temperature and humidity, generated during heating of the object to be cooked during cooking, and changes in temperature of the object at the center of the object and the surface of the object in order to provide for an automatic cooking operation.

Although the '764 Patent provides some degree of cooking automation, the described appliance requires the kitchen worker to identify the type of food and place the food within a cooking chamber.

In contrast, what is desired is a more robust system that may serve in a kitchen environment for preparing multiple types of food (perhaps newly placed or unknown food items), on a range of different types of cooking equipment, without being required to be placed in a controlled chamber, and with limited involvement of kitchen workers. Indeed, many types of food are prepared outside of an enclosed oven.

Additionally, kitchen environments can vary widely and have a number of challenges which makes automating food preparation processes difficult. For example, work surfaces in kitchen environments have appearances that change rapidly. A griddle commonly used to cook items such as hamburger patties, chicken breasts, onions, and steaks, rapidly accumulates residuals such as grease, liquids, and particles from the food prepared on it. Due to high temperatures, these residuals are quickly carbonized, creating dark surfaces on the griddle which make automatic recognition of the food challenging in at least two ways: 1) they reduce the contrast between the food items to be identified and the work surface; and 2) they create an underlying source of variability in any sensor data that is collected. The resulting suboptimal sensor data limits the ability of machine-based, automated systems to automatically recognize food items and food preparation items, thereby making automation of food preparation more difficult.

Gases created during the cooking process also make collecting accurate sensor data difficult. Specifically, water and grease from food items and cooking surfaces may collect on sensors and obscure readings resulting in reduced signal to noise ratios for the affected sensors. Taken together, these challenges make obtaining accurate sensor data difficult. Consequently, there is still a need for improved systems and methods for recognizing and preparing food in the kitchen environment.

SUMMARY OF THE INVENTION

A method for preparing food comprises aiming a combination of sensors, at least one of which is an IR camera, at a food preparation area; inspecting the food preparation area using the sensors to obtain image data information; and determining identity and position information of the food item or food preparation item based on the image data information from the inspecting step.

In embodiments, the method further comprises determining an output to command a robotic arm, instruct a kitchen worker, or otherwise assist in food preparation. In embodiments, the command is an instruction to perform a step in a food preparation process for an identified food item consistent with recipe information provided during set-up. In embodiments, the steps can be performed multiple times after set-up.

In embodiments, the step of aiming the combination of sensors includes aiming the infrared (IR) camera, an RGB camera, and a depth sensor at the food preparation area.

In embodiments, the step of aiming the combination of sensors is performed as a part of the setup of the system and the system can perform the inspecting and determining steps multiple times without additional aiming steps, in an automated manner. In embodiments, the system is further able to determine the output to command a robotic arm, instruct a kitchen worker, or otherwise assist in food preparation, multiple times without additional aiming steps. In embodiments, in cases where the command has been issued to command the robotic arm, the system is able to actuate the robotic arm and perform the command. In embodiments, the system is able to determine whether the command has been performed. In embodiments, once the system has validated that the command has been performed, the system can determine a subsequent command, in an automated manner.

In embodiments, the method further comprises processing the image data from the combination of sensors to obtain combined image data. In embodiments, the combining of the image data from the sensors further comprises transforming the image data into a single coordinate frame. In embodiments, the combining of the image data further comprises aligning the data such that there are image data from each image sensor at each point in the combined image data.

In embodiments, the step of determining is performed using a trained neural network.

In embodiments, the food preparation item is an item selected from the group consisting of kitchen implement, and a kitchen worker, or appendage of the kitchen worker.

In embodiments, an automated kitchen assistant system comprises a combination of sensors to inspect a food preparation area in the kitchen environment. The combination of sensors includes an Infrared (IR) camera that generates IR image data and a second sensor that generates second image data. In embodiments, the system further includes one or more processors to pre-process the IR image data and second image data into combined image data. The processor (s) is further operable to automatically recognize and provide location information for the at least one food item or food preparation item using the image data.

In embodiments, the combination of sensors further includes a third sensor which is a depth sensor and image data from the depth sensor is combined with the image data from the first and second sensor. In embodiments, image data from the combination of sensors is combined into a form suitable to serve as an input layer for a convolutional neural network. In embodiments, image data from the combination of sensors is combined into a form suitable to serve as an input layer for an algorithm capable of recognizing and providing location information for the at least one food item or food preparation item using the image data.

In embodiments, the image data from the sensors are transformed into a single coordinate frame prior to the combining of the image data.

In embodiments, the combining of the image data from the sensors comprises transforming the image data into a single coordinate frame and aligning the data, such that there are data from each image sensor at each point in the image data.

In embodiments, the at least one processor is operable to determine a position estimate of the at least one food item or food preparation item.

In embodiments, the processor is operable to automatically recognize objects in the food preparation area including food items, kitchen implements, a kitchen worker, or an appendage of a kitchen worker.

In embodiments, the processor is further operable to compute an output based on the combined image data, wherein the output comprises a probability that at least one food item or food preparation item is present in a particular region of the combined image data.

In embodiments, the processor employs a trained convolutional neural network.

In embodiments, multiple processors are used to perform the various steps performed by the processor.

In embodiments, machine vision algorithms and transformations are used to improve the accuracy of the location information for recognized objects.

In embodiments, after the robotic kitchen assistant has been set up including the aiming of the combination of sensors at the food preparation area and a calibration process, the RKA can operate in an autonomous manner. In embodiments, the RKA is adapted to perform the steps of sensing, inspecting, determining identity and position information, and determining an output to command automatically and without human intervention or assistance. In embodiments, the RKA is further able to determine if a food preparation command has been performed and automatically determine a second food preparation command.

The description, objects and advantages of the present invention will become apparent from the detailed description to follow, together with the accompanying drawings.

DETAILED DESCRIPTION OF THE INVENTION

Before the present invention is described in detail, it is to be understood that this invention is not limited to particular variations set forth herein as various changes or modifications may be made to the invention described and equivalents may be substituted without departing from the spirit and scope of the invention. As will be apparent to those of skill in the art upon reading this disclosure, each of the individual embodiments described and illustrated herein has discrete components and features which may be readily separated from or combined with the features of any of the other several embodiments without departing from the scope or spirit of the present invention. In addition, many modifications may be made to adapt a particular situation, material, composition of matter, process, process act(s) or step(s) to the objective(s), spirit or scope of the present invention. All such modifications are intended to be within the scope of the claims made herein.

Methods recited herein may be carried out in any order of the recited events which is logically possible, as well as the recited order of events. Furthermore, where a range of values is provided, it is understood that every intervening value, between the upper and lower limit of that range and any other stated or intervening value in that stated range is encompassed within the invention. Also, it is contemplated that any optional feature of the inventive variations described may be set forth and claimed independently, or in combination with any one or more of the features described herein.

All existing subject matter mentioned herein (e.g., publications, patents, patent applications and hardware) is incorporated by reference herein in its entirety except insofar as the subject matter may conflict with that of the present invention (in which case what is present herein shall prevail).

Reference to a singular item, includes the possibility that there are plural of the same items present. More specifically, as used herein and in the appended claims, the singular forms "a," "an," "said" and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation. Last, it is to be appreciated that unless defined otherwise, all technical and scientific terms used herein have the same meaning as commonly understood by one of ordinary skill in the art to which this invention belongs.

Apparatus Overview

Figure 1:
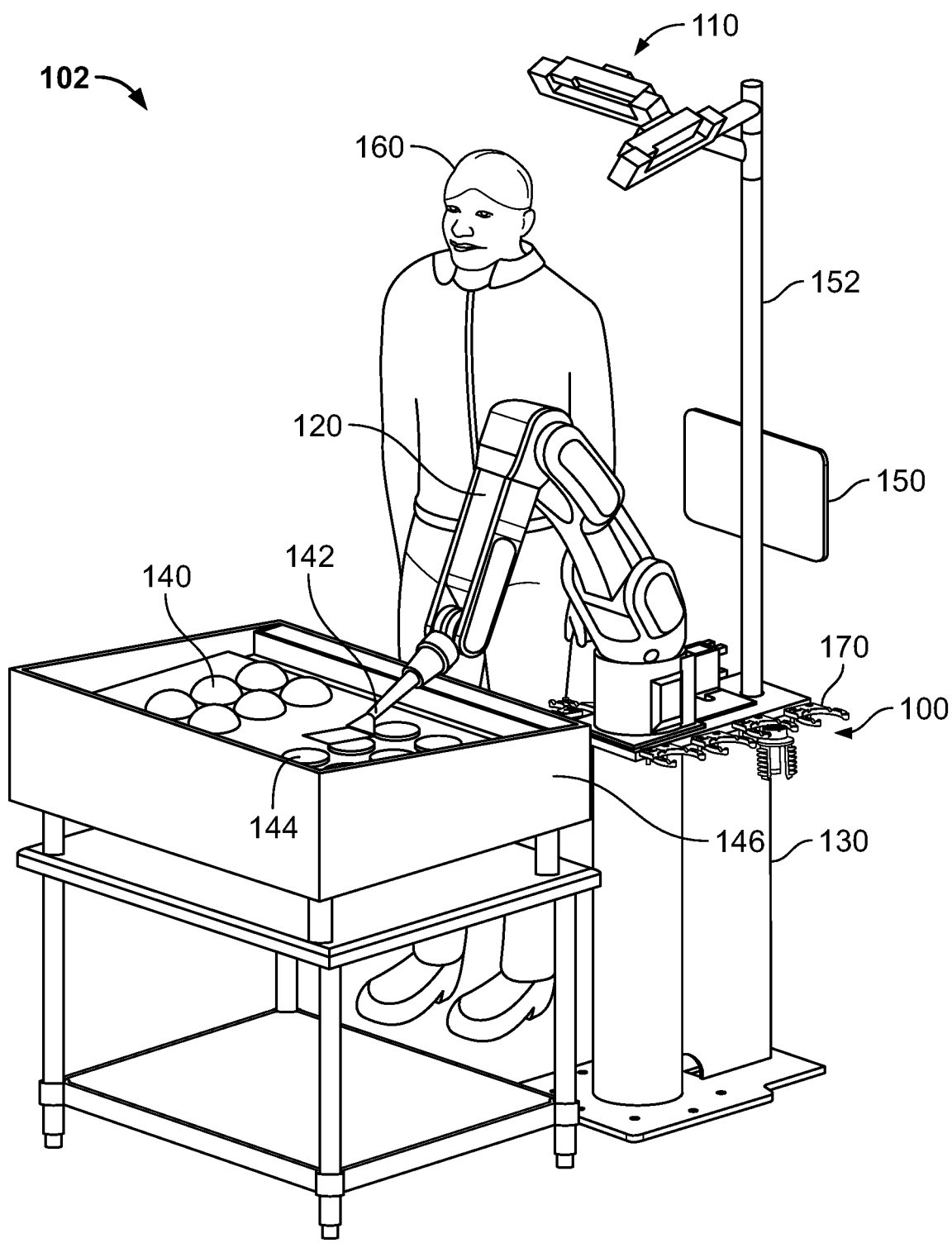
FIG. 1 illustrates an automated kitchen assistant system in a kitchen environment.

FIG. 1 is an illustration of an automated or robotic kitchen assistant system 100 in a kitchen environment 102 in accordance with one embodiment of the invention. By "kitchen environment", it is meant to include food preparation areas such as, for example, residential kitchens, commercial kitchens, restaurant kitchens, food stands, delicatessens, counters, tableside at restaurants, front of house at restaurants, food stands and mobile kitchens.

System 100 is shown having a plurality of sensors 110, a robotic arm 120, and an enclosure 130 for housing a processor and other hardware which are operable, as described further herein, to receive data from the sensors 110, process the data, and to recognize and locate the food 140, 142. Although food 140,142 are shown as a bun and burger respectively, it is to be understood that the types of food contemplated herein may vary widely. Examples of food items include, without limitation, meat, burgers, vegetables, potatoes, fries, pizza, seasonings, sauces, frostings, fruits, starches, water, oils and other ingredients or combinations thereof.

Additionally, in embodiments, the system 100 is operable to automatically control the robotic arm 120 to carry out one or more steps in preparing the food. FIG. 1 illustrates the system moving a spatula 142 to flip the burger 144 on a stove 146, but the invention is not so limited. A wide range of cooking or food preparation steps may be performed by the robotic arm including, without limitation, gathering, sorting, storing, washing, peeling, cutting, slicing, combining, mixing, grilling, sautéing, frying, boiling, baking, microwaving, broiling, placing, removing, braising, cooking, cooling, icing, seasoning, assembling, pouring and plating. The robotic kitchen assistant system may also be operable with a wide range of kitchen tools, appliances, equipment and dishware including, for example, plates, utensils, pots, pans, baskets, stoves, cutting boards, dispensers, ovens, fryers, grills, microwaves, stovetops, mixers, refrigerators, freezers, slicers, and food processors (hereinafter referred to collectively as "kitchen implements").

Additionally, the motion and configuration of the robotic arm may vary widely. Examples of robotic arms, motion, training, and systems are shown and described in Provisional Patent Application No. 62/467,743, filed Mar. 6, 2017, entitled "Robotic System for Preparing Food Items in a Commercial Kitchen"; US Patent Publication No. 2017/0252922 to Levine et al.; and U.S. Pat. No. 9,785,911 to Galluzzo et al., each of which is incorporated by reference in its entirety.

FIG. 1 also shows a display 150 coupled to the enclosure 130 via a support 152. The display can be operable to interface with kitchen worker 160. An example of an interactive display is a tablet or touchscreen monitor. The kitchen worker may input information (for example, a modification to an order) with the user interface 150. Additionally, commands and information may be provided to the kitchen worker on the display 150 or in some embodiments via speakers, a watch, or text message on a mobile phone.

The number and types of sensors 110 may vary widely. In embodiments, the plurality of sensors includes a visible spectrum camera (e.g., a black and white, or RGB camera), a depth sensor, and an infrared (IR) camera.

The infrared or IR camera generates IR image data by measuring the intensity of infrared waves and providing data representing such measurements over the observed area. In embodiments, the focal length of the camera lens and orientation of the optics has been set such that area imaged includes the work area. Preferably, the IR camera is adapted to measure the intensity of IR waves (typically in the range of 7.2 to 13 microns, but other wavelengths in the IR may be used) over an area and generates IR image data. An exemplary IR sensor is the CompactPro high resolution thermal imaging camera manufactured by Seek Thermal Corporation (Santa Barbara, Calif.), which can provide an image of size 320×240 with each value a 16-bit unsigned integer representing measured IR intensity.

In embodiments, the visible spectrum camera is an RGB camera to generate image data. The RGB image comprises a 960 by 540 grid with intensity data for red, green, and blue portions of the spectrum for each pixel in the form of 8-bit unsigned integers. In embodiments, the focal length of the camera lens and orientation of the optics have been set such that area imaged includes the work surface. An exemplary visible spectrum sensor is the Kinect One sensor manufactured Microsoft Corporation (Redmond, Wash.). In embodiments, a black and white visible spectrum camera is used.

A depth sensor incorporates a time of flight (TOF) camera to generate data on the distance of each point in the field of view from the camera. The TOF camera is a range imaging camera system that resolves distance based on the known speed of light, measuring the time-of-flight of a light signal between the camera and the subject for each point of the image. In embodiments, the image comprises a 960 by 540 grid with a value of the distance from the sensor for each point in the form of a 16-bit unsigned integer. An exemplary depth sensor is the Kinect One sensor manufactured Microsoft Corporation (Redmond, Wash.). In embodiments, other types of depth sensors are employed, such as devices using texturing (typically performed with an IR or near IR projector and two sensors) and stereo reconstruction, lidar, and stereoscopic cameras.

Without intending to be bound to theory, we have discovered the IR camera sensors providing IR image data have the potential to mitigate or overcome the above-mentioned shortcomings associated with conventional automated cooking equipment. Due to the temperature differences typically present when an uncooked food is placed on a hot grill or other high temperature cooking surface or when a kitchen worker or kitchen worker's appendage is imaged against a predominantly room temperature background, IR camera sensors are able to provide high contrast and high signal-to-noise image data that is an important starting point for determining identity and location of kitchen objects, including food items, food preparation items and human workers. In contrast, the signal-to-noise ratio is significantly lower using only traditional RGB images than if using IR images. This occurs because some kitchen backgrounds, work surfaces, and cooking surfaces can be similar to food items in color, but temperatures are generally significantly different. Based on the foregoing, embodiments of the invention include IR-camera sensors in combination with other types of sensors as described herein.

Figure 2A:
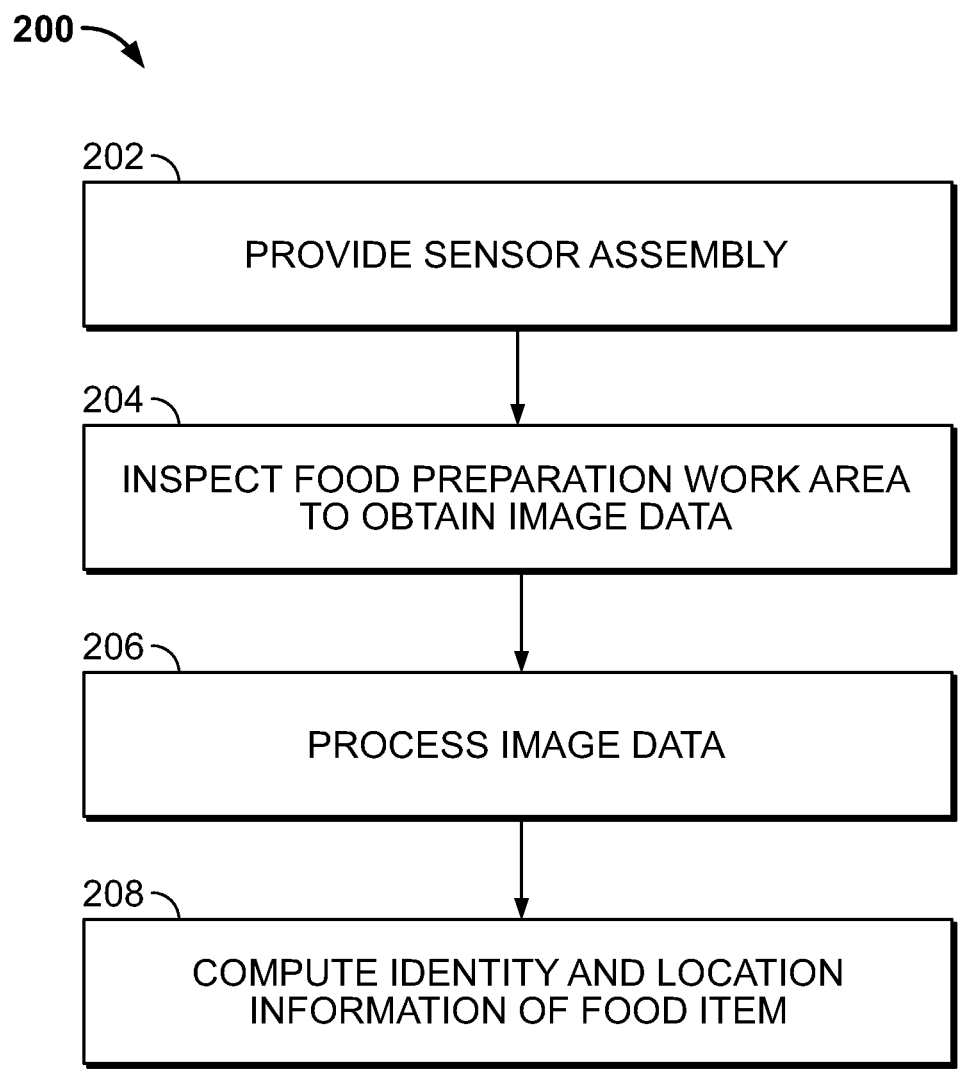
FIG. 2A is a flow diagram of a method for recognizing a type of food.

FIG. 2A represents a general overview of a method 200 for recognizing a food item in accordance with one embodiment of the invention.

Step 202 states to provide a sensor assembly. The sensor assembly may include a plurality of sensors, at least one of which is an IR camera as described herein. In embodiments, and as shown in FIG. 1, the sensor assembly 110 is provided by installing a sensor array above the cooking worksurface. In FIG. 1, the sensor array 110 is shown being aimed at the food and working surface.

Step 204 states to inspect the food preparation work area to obtain sensor image data. As described further herein, in embodiments, the sensors generate data in the form of image data of an area.

Step 206 states to process the image data from the sensors. As described further herein, the image data is input to a customized software program, engine, or module. In embodiments, the image data is input to a Kitchen Scene Understanding Engine, which may include a trained convolutional neural network or another means for processing and object recognition.

Step 208 states to compute identity and location information of the food item or food preparation item. In embodiments, a probability of the identity and area within which the food item or food preparation item is located is computed by a Kitchen Scene Understanding Engine.

It is to be understood that in addition to identifying and locating food, step 208 is equally applicable to identify and locate kitchen implements, and other objects detected by the sensors such as, without limitation, the kitchen worker or a part of the kitchen worker, such as his hand. Herein, the kitchen worker or a portion of the kitchen worker, robot or a portion of the robot, kitchen implements including appliances, dishware, and tools used in the preparation of food are collectively referred to as "food preparation items"). Additionally, by "kitchen object" it is meant either a food item or food preparation item.

Optionally, and as discussed further herein, the identity and location information may be used to control a robotic arm or instruct a kitchen worker, or otherwise carry out a desired food preparation step, such as for example, turning on an appliance.

Optionally, the control of the robotic arm is done autonomously or automatically, namely, without human instruction to carry out particular movements.

Figure 2B:
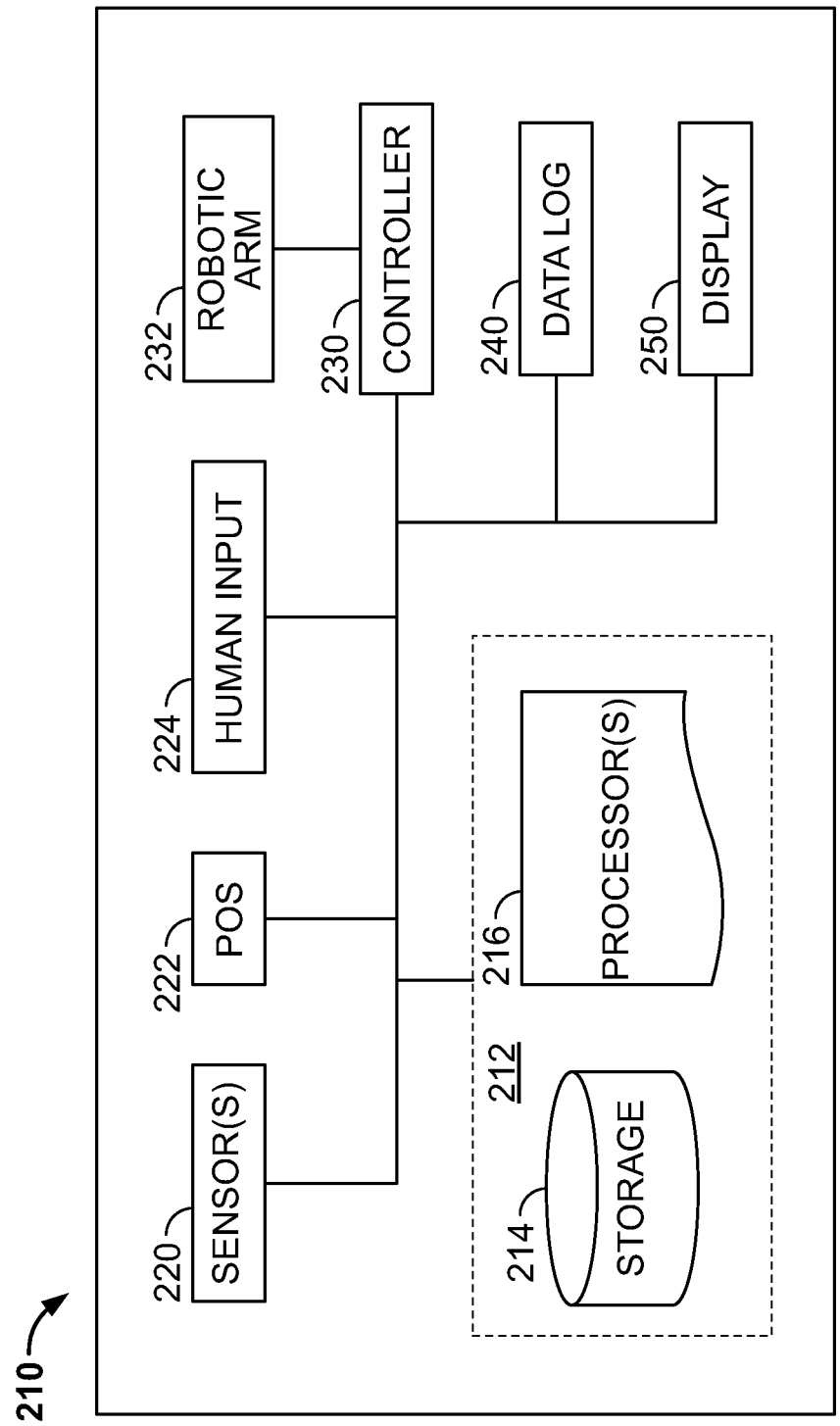
FIG. 2B schematically depicts an example architecture of an automated kitchen assistant system.

FIG. 2B schematically depicts an example architecture 210 of an automated kitchen assistant system. Particularly, a computer, workstation, or server (each of which is represented by reference numeral 212) is shown comprising storage 214, and a processor 216 (e.g., a CPU and in some cases a GPU). In embodiments, one or more processors may be used to perform the functions and steps described herein. In some embodiments, multiple GPUs may be used. In some embodiments, only a CPU or multiple CPUs may be used.

The computer 212 is shown connected to sensors 220, restaurant's point of sale (POS) system 222, human input device 224, display 250, controller 230 for the robotic arm 232, and data log 240.

In embodiments, one or more of the components are remote and connected to the other components of the robotic kitchen assistant system via the Internet or other type of network.

Figure 3:
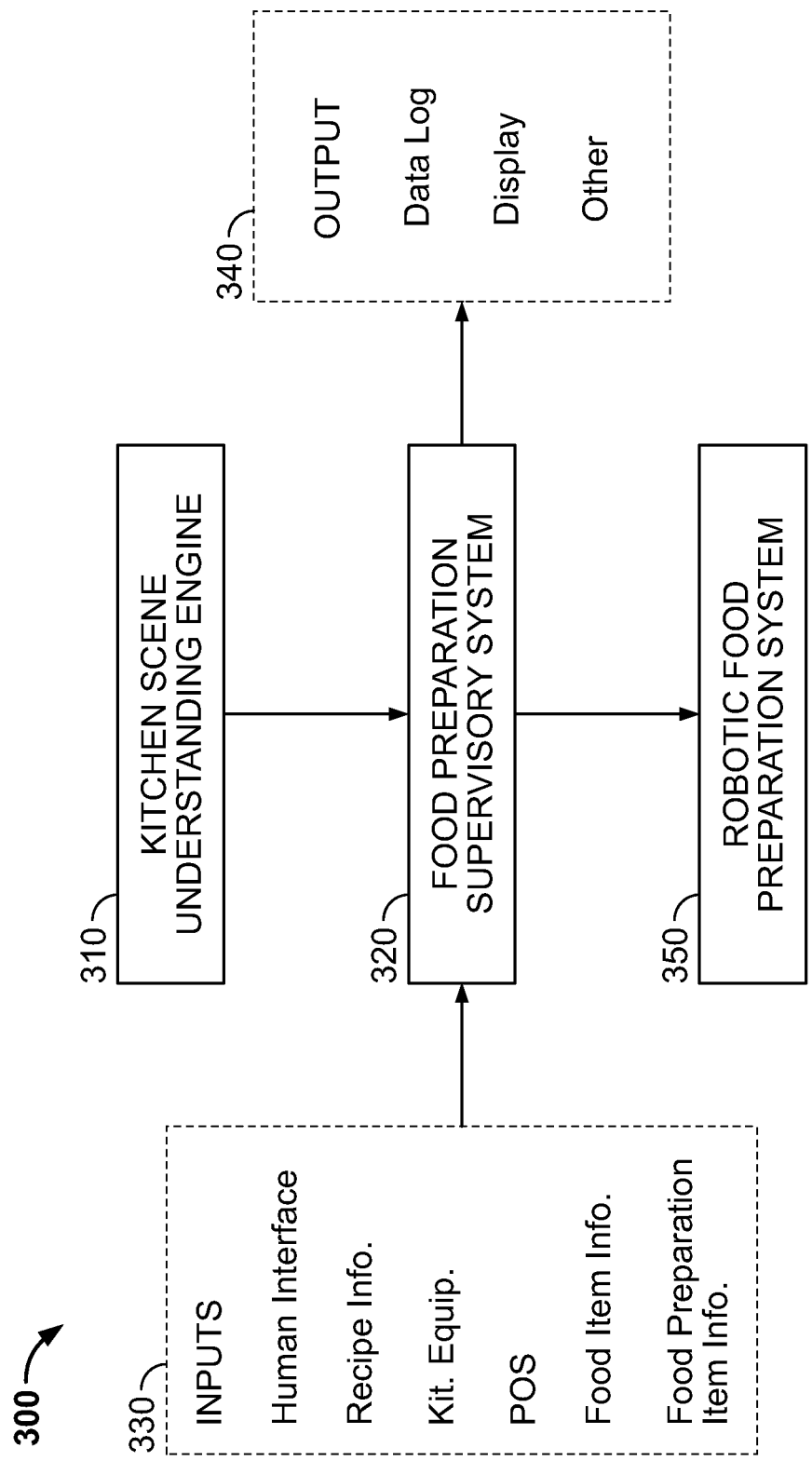
FIGS. 3-5 depict various software modules of an automated kitchen assistant system in accordance with embodiments of the invention.

FIG. 3 depicts various software modules or engines 300 of an automated kitchen assistant system in accordance with an embodiment of the invention. Particularly, FIG. 3 shows additional detail on the cooperation between the Kitchen Scene Understanding Engine 310, the Food Preparation Supervisory System 320, Input 330, Output 340, and the Robotic Food Preparation System 350.

In embodiments, the Kitchen Scene Understanding Engine 310 serves to track all relevant objects in the work area, including but not limited to food items, kitchen implements, and human workers or parts thereof. Data on these objects including but not limited to their identity and location are provided to the Food Preparation Supervisory System 320, which generates the instructions for preparing the food item. These instructions are provided to either or both the Robotic Food Preparation System 350 and to the human worker by display 340. In some embodiments, the Food Preparation Supervisory System 320 detects/notices the presence of new food preparation items and automatically begins the food preparation process. In some embodiments, the Food Preparation Supervisory Systems 320 is operable to signal the Robotic Food Preparation System 350 to control the robot arm or instruct a human worker to retrieve raw ingredients from nearby cold or dry storage based on an order received from the restaurant's POS system.

In embodiments, once the appropriate food preparation item is recognized by the Kitchen Scene Understanding Engine 310, the Food Preparation Supervisory System 320 begins the food preparation process for that item. For example, in embodiments, the processor is operable to use recipe data to select actions and send appropriate signals to the system's controller to generate motion by the robot arm that manipulates the food on the work surface and/or signals the human worker to perform a task by displaying information on the display.

The Food Preparation Supervisory System 320 shown in FIG. 3 has access to a wide range of inputs 330 including, without limitation, recipe data, inventory of kitchen implements including their specifications, information on food items, information on food preparation items, and orders from the restaurant's point of sale (POS) system. Examples of means to provide inputs 330 to the Food Preparatory Supervisory System 320 includes a human interface such as a tablet or keyboard, a locally connected drive or server, a restaurant or vendor's customized software system, or an internet connected server.

Figure 4:
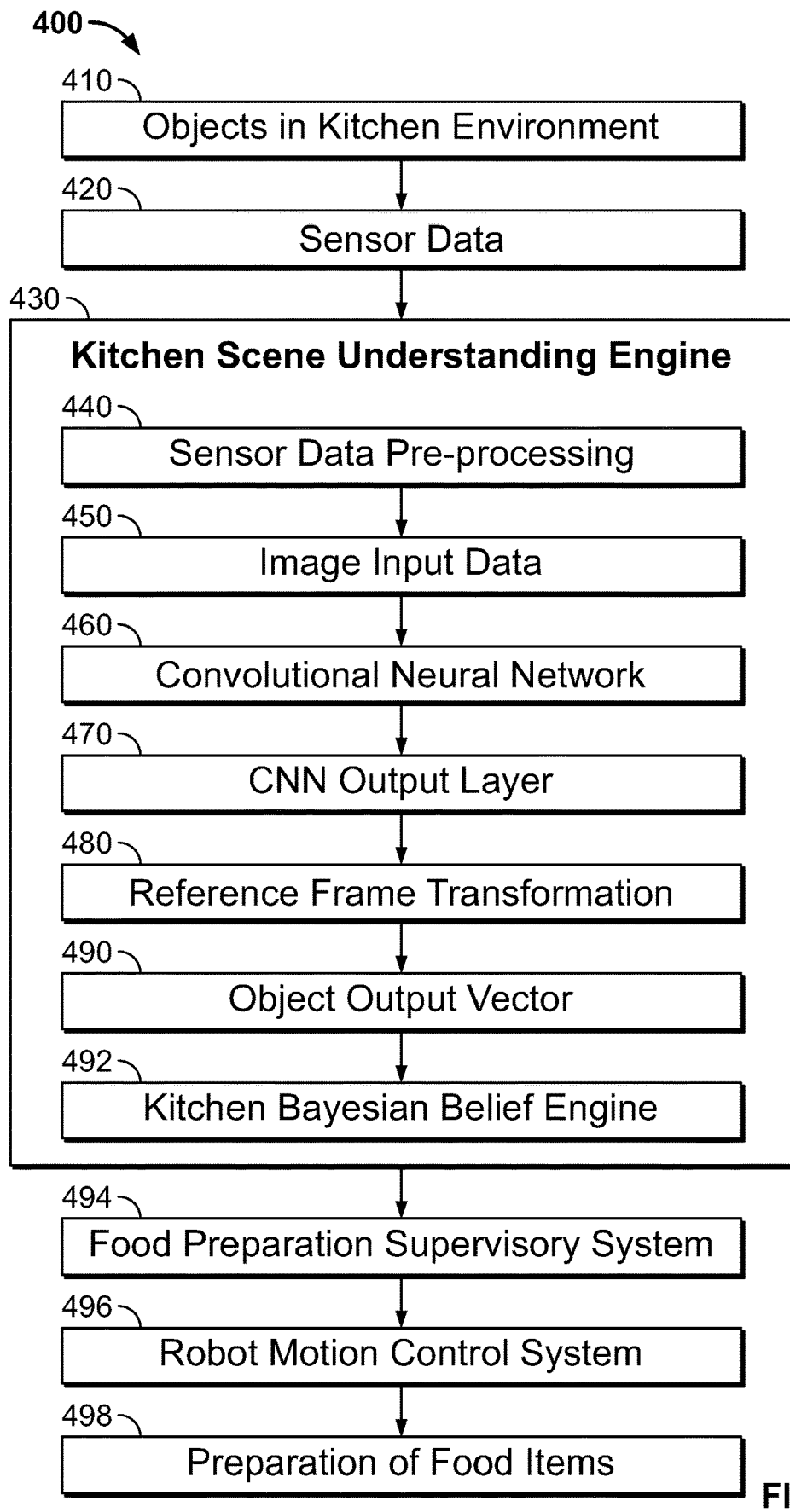

FIG. 4 depicts additional detail on the Kitchen Scene Understanding Engine 430 and its cooperation with other modules of the robotic kitchen assistant system 400. Particularly, sensor image data 420, including IR image data arising from viewing objects in the kitchen environment 410, is provided to the kitchen scene understanding engine 430. As described further herein, and with reference to FIG. 6, sensor image data 420 is pre-processed 440 in order that the multi-sensor image data are aligned, or registered into one reference frame (e.g., the IR image reference frame).

The combined image data serves as the input layer 450 to a trained convolutional neural network (CNN) 460.

As shown with reference to step 460, a CNN processes the image input data to produce the CNN output layer 470. In embodiments, the CNN has been trained to identify food items and food preparation items, kitchen items, and other objects as may be necessary for the preparation of food items. Such items include but are not limited to human workers, kitchen implements, and food.

For each set of combined image data provided as an input layer to the CNN, the CNN outputs a CNN output layer 470 containing location in the image data and associated confidence levels for objects the CNN has been trained to recognize. In embodiments, the location data contained in the output layer 470 is in the form of a "bounding box" in the image data defined by two corners of a rectangle.

As described further herein, one embodiment of the CNN 460 is a combination of a region proposal network and CNN. An example of region proposal network and CNN is described in Shaoqing Ren, Kaiming He, Ross Girshick, and Jian Sun, "Faster R-CNN: Towards Real-Time Object Detection with Region Proposal Networks Faster", IEEE Transactions on Pattern Analysis and Machine Intelligence, Volume 39 Issue 6, June 2017, which is hereby incorporated by reference in its entirety. Examples of other types of convolution neural networks are described in Patent Publication Nos. US 20170169315 entitled "Deeply learned convolutional neural networks (cnns) for object localization and classification"; 20170206431 entitled "Object detection and classification in images", and U.S. Pat. No. 9,542,621 entitled "Spatial pyramid pooling networks for image processing", each of which is herein incorporated by reference in its entirety.

Optionally, the accuracy of the object's location within the image may be further computed. In some embodiments, for example, image data from at least one sensor are further processed using known transformations and machine vision techniques to more accurately determine an object's location. In some embodiments, for example, IR image data measured within the area defined by the bounding box taken from the CNN output layer is further processed to more accurately determine an object's location. Techniques to do so include various computer vision and segmentation algorithms known in the art such Ohta, Yu-Ichi, Takeo Kanade, and Toshiyuki Sakai. "Color information for region segmentation." Computer graphics and image processing 13.3 (1980): 222-241; and Beucher, Serge, and Fernand Meyer. "The morphological approach to segmentation: the watershed transformation." Optical Engineering-New York-Marcel Dekker Incorporated—34 (1992): 433-433.

In some embodiments, determining location information includes determining information on orientation including angular position, angle, or attitude.

It is to be appreciated that the direct incorporation of the IR image data into the image data that, along with the RGB and depth data, makes up the input layer 450 to the CNN 460 improves the performance of the system. Although determining exactly why the inclusion of a given sensor improves the capabilities of a CNN is challenging because of the nature of CNNs, we conjecture, and without intending to be bound to theory, that the IR data offer higher signal-to-noise ratios for certain objects of a given temperature in a kitchen environment where such objects are often placed on work surfaces or imaged against backgrounds with significantly different temperatures. In cases where the CNN is used to recognize foods by the extent to which they are cooked, the IR data provides helpful information to the CNN on the thermal state of the food item and work surface, which can be a cooking surface.

With reference again to FIG. 4, the CNN output layer 470 is then further processed to translate the location data of the identified objects given in the two dimensional coordinate system of the image into a three dimensional coordinate system such as a world coordinate frame or system reference frame. In embodiments, the world coordinate frame is the same frame used by the robot 480. Step 480 may be carried out using standard transformations such as those referenced herein.

In some embodiments, the location data given in the CNN output layer 470 is further processed by operating exclusively on the IR image data to more accurately identify the location of objects identified by the CNN in a three dimensional coordinate frame which may be the world coordinate frame using standard computer vision algorithms as referenced herein.

The resulting vector shown in FIG. 4, is an object output vector 490, and represents a single observation on the presence of food or other items described herein. In embodiments, particularly, the object output vector 490 contains the location of recognized objects in the input layer reference frame and a confidence level that each such recognized object is the object the CNN has been trained to identify. The position of the objects is subsequently processed into a 3D or world coordinate frame. In embodiments, the object output vector 490 contains the location of recognized objects in the 3D coordinate frame and a confidence level that each such recognized object is the object the CNN has been trained to identify.

Kitchen Bayesian Belief Engine 492, described further herein, receives the object output vector 490 and assembles/aggregates the real-time continuous stream of these vectors into a set of beliefs which represents the state of all recognized food and kitchen implements in the kitchen area.

Figure 5:
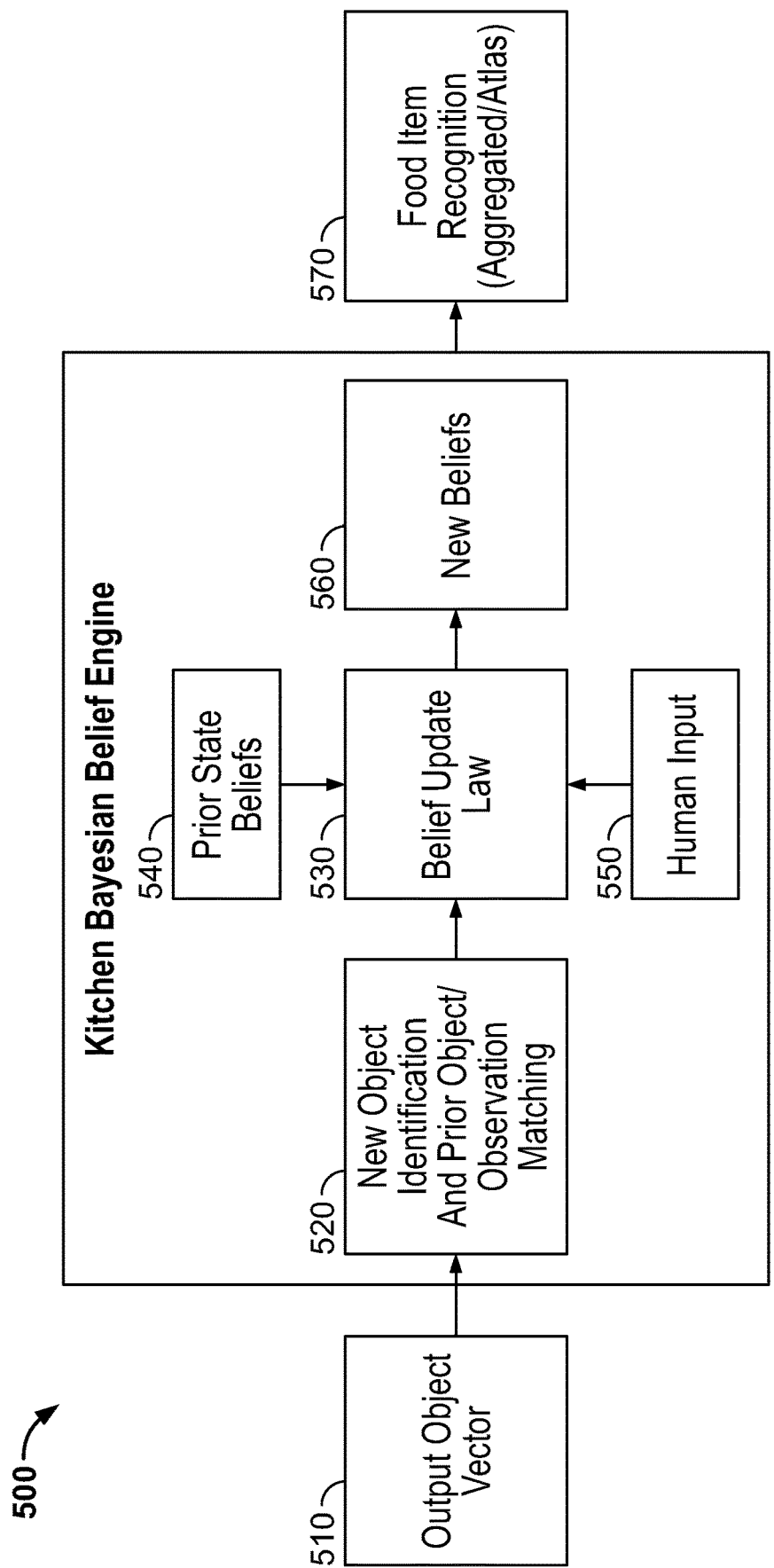

With reference to FIG. 5, the resulting stream of observations is processed by the Kitchen Bayesian Belief Engine 500 into a set of beliefs about recognized objects in the relevant work area, namely, the kitchen.

FIG. 5 shows vector 510 of recognized objects and their location is input to the KBBE 500.

Step 520 states to evaluate vector 510 to assess whether the recognized objects represent new objects as yet unidentified or are existing objects that have been previously recognized.

The resulting information is then processed by a belief update law 530 which evaluates the observations in the context of the system's prior beliefs 540 as well as any human input 550 that may have been supplied.

The output of the belief update rules or law is a final set of beliefs 560 on the state of the system. The state includes identity and location of all known objects in the observation area. In a sense, the output of the engine 500 is an atlas or aggregated set of information on the types of food, kitchen implements, and workers within the work space. An example of a final set of beliefs is represented as a list of objects that are believed to exist with associated classification confidences and location estimates.

Figure 6:
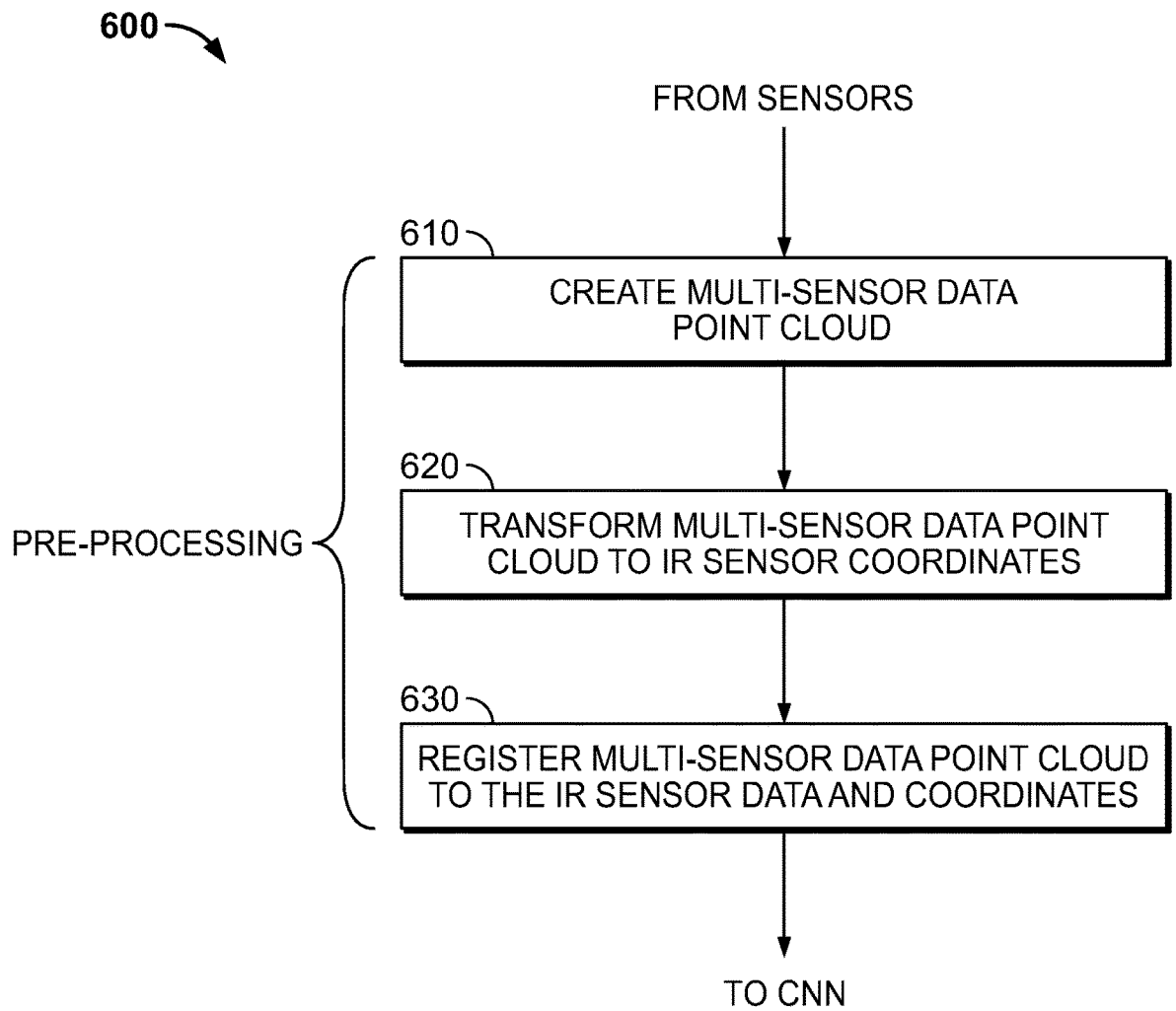
FIG. 6 is a flow diagram of a method for processing data from multiple sensors in accordance with an embodiment of the invention.

As stated above, in embodiments, the data from multiple sensors is pre-processed prior to being fed to the CNN. FIG. 6 is a flow diagram showing details of a method 600 for pre-processing data from multiple sensors in accordance with an embodiment of the invention.

Step 610 states to create multi-sensor point cloud. Image data from RGB and depth sensors are combined into a point cloud as is known in the art. In embodiments, the resulting point cloud is a size of m by n with X, Y, Z, and RGB at each point (herein we refer to the combined RGB and depth image point cloud as "the RGBD point cloud"). In embodiments, the size of the RGBD point cloud is 960 by 540.

Step 620 states to transform the multi-sensor point cloud to the IR sensor coordinates. The process of transforming an image from one frame to another is commonly referred to as registration (see, e.g., Lucas, Bruce D., and Takeo Kanade. "An iterative image registration technique with an application to stereo vision." (1981): 674-679). Particularly, in embodiments, the RGBD point cloud is transformed into the frame of the IR camera using extrinsic transformations and re-projection. In embodiments, because the field of view of the RGB and depth sensors is larger than the field of view of the IR sensor, a portion of the RGB and depth data is cropped during registration and the resulting RGBD point cloud becomes 720 by 540.

Step 630 states to register the multi-sensor point cloud to the IR sensor data and coordinates. The transformed RGBD point cloud is registered into the IR frame by projecting the RGBD data into the IR image frame. In embodiments, the resulting combined sensor image input data is 720 by 540 RGBD, and IR data for each point. In embodiments, values are converted to 8-bit unsigned integers. In other embodiments, the registration process is reversed and the IR image is projected into the RGBD frame.

Figure 9:
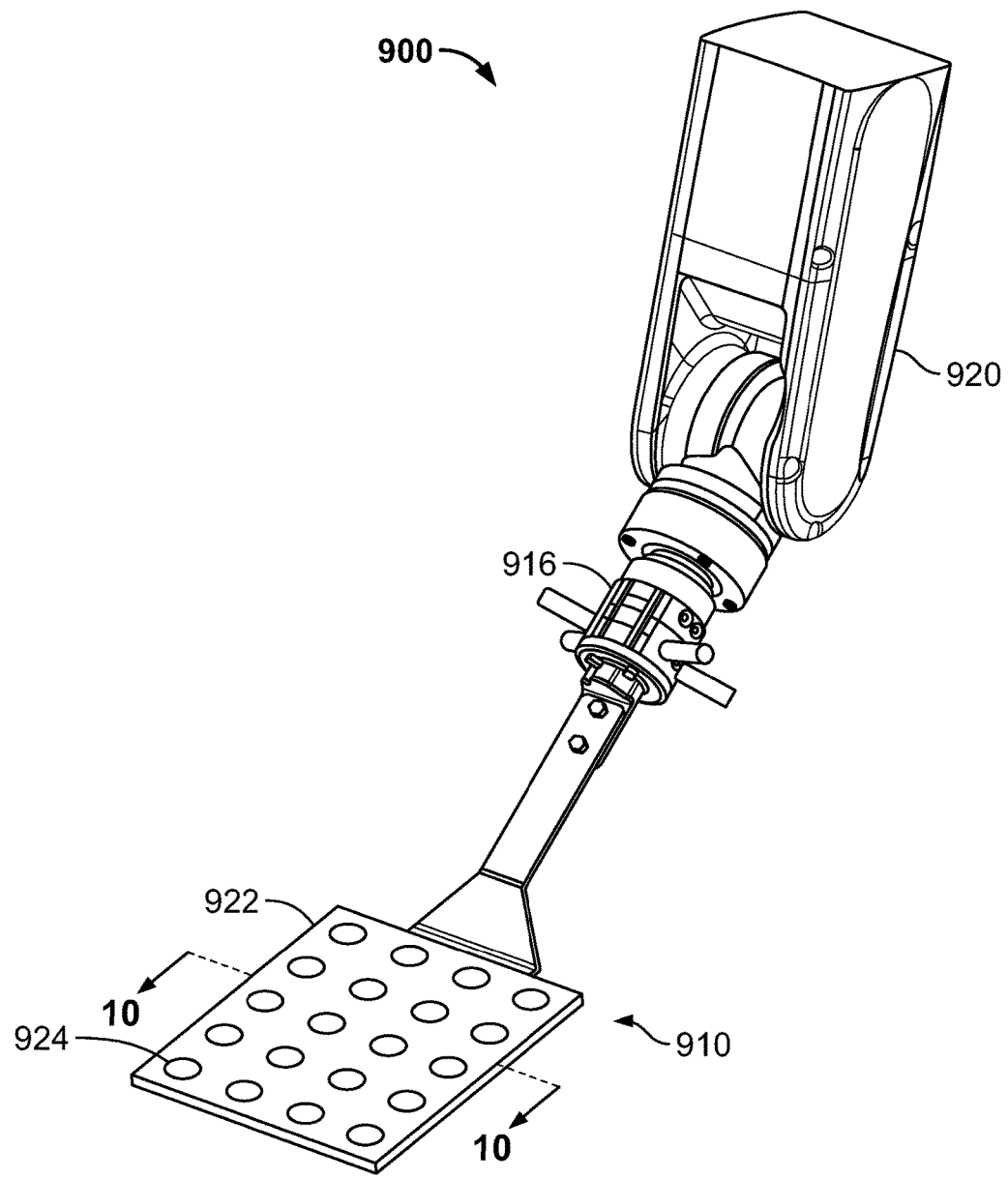
FIG. 9 is an illustration of a tool for calibrating multiple sensors of a robotic kitchen assistant in accordance with an embodiment of the invention.

In embodiments with multiple sensors, including IR camera, the registration of the data from the various sensors simplifies the training of the CNN. Registering the IR data and the RGB and depth data in the same frame of reference converts the input (namely, the image input data 450 of FIG. 4) into a more convenient form for the CNN, improving the accuracy of the CNN to recognize food items and/or reducing the number of labeled input images required to train the CNN. Additionally, the time required to perform calibration may be reduced by creating a single calibration target that produces high signal-to-noise ratio signals for multiple sensors, discussed further below in connection with FIGS. 9-10.

Following step 630, the registered multi-sensor image data is fed into the CNN.

Figure 7:
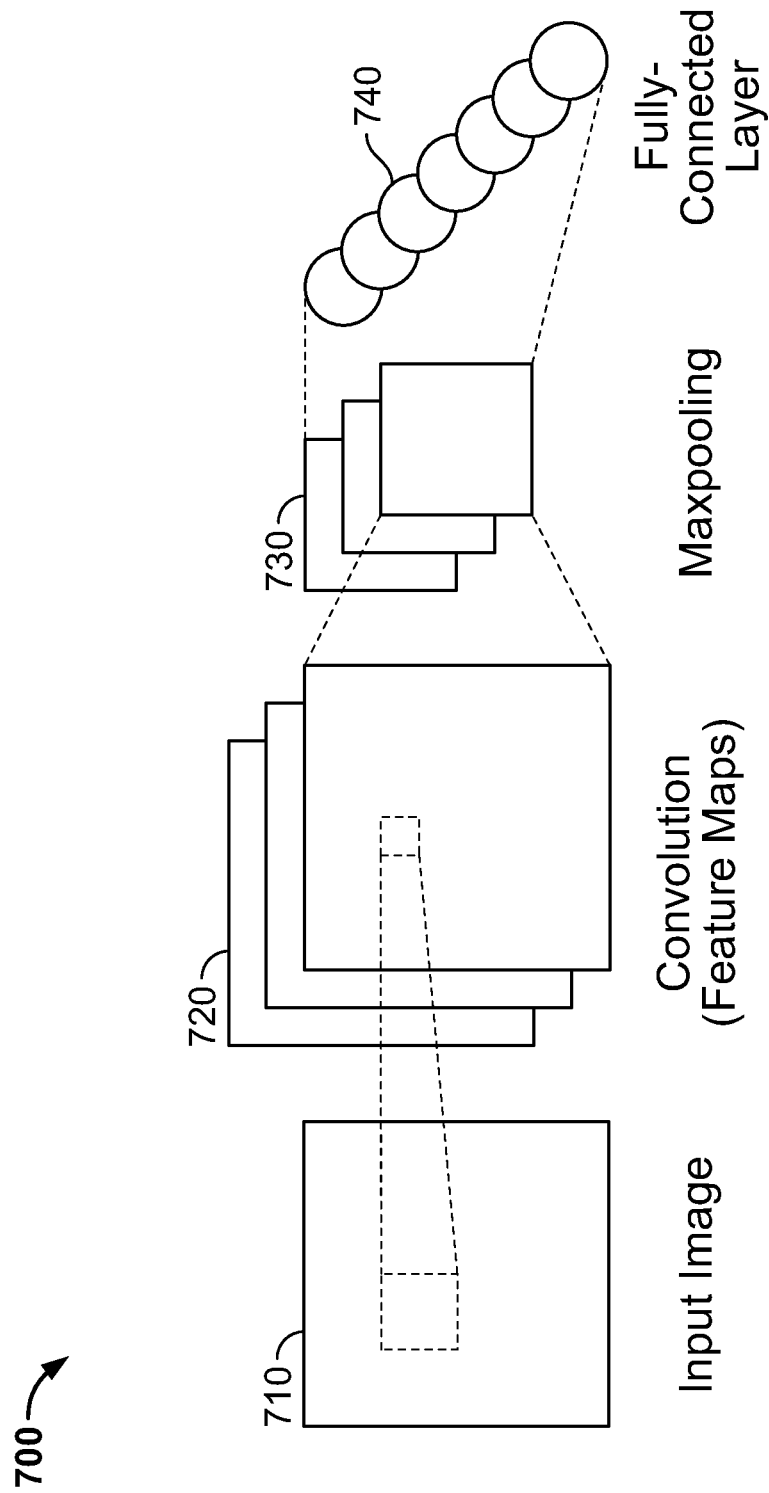
FIG. 7 schematically depicts an example architecture of a convolutional neural network.

With reference to FIG. 7, embodiments of the invention employ a trained CNN 700 to compute the identity and location of the food item or kitchen preparation item based on the input image. Particularly, FIG. 7 shows input image 710 serving as the input layer to the convolutional layers 720, max pooling layer 730, and fully connected layer 740. In embodiments, the CNN is a region proposal network and fast r-CNN as referenced above.

In embodiments, the output layer of the CNN is the prediction vector which gives the objects recognized by the CNN, along with a confidence level (e.g., from zero to one), and their location in the two dimensional image data. In embodiments, the location is characterized using a bounding box and denoting two corner points of the bounding box in the image plane.

The length of the output vector is equal to the number of objects that the CNN has been trained to identify. In embodiments, the length of the output vector ranges from 1 to 500, preferably from 50 to 200, and most preferably from 75 to 125.

Training the CNN

Figure 8:
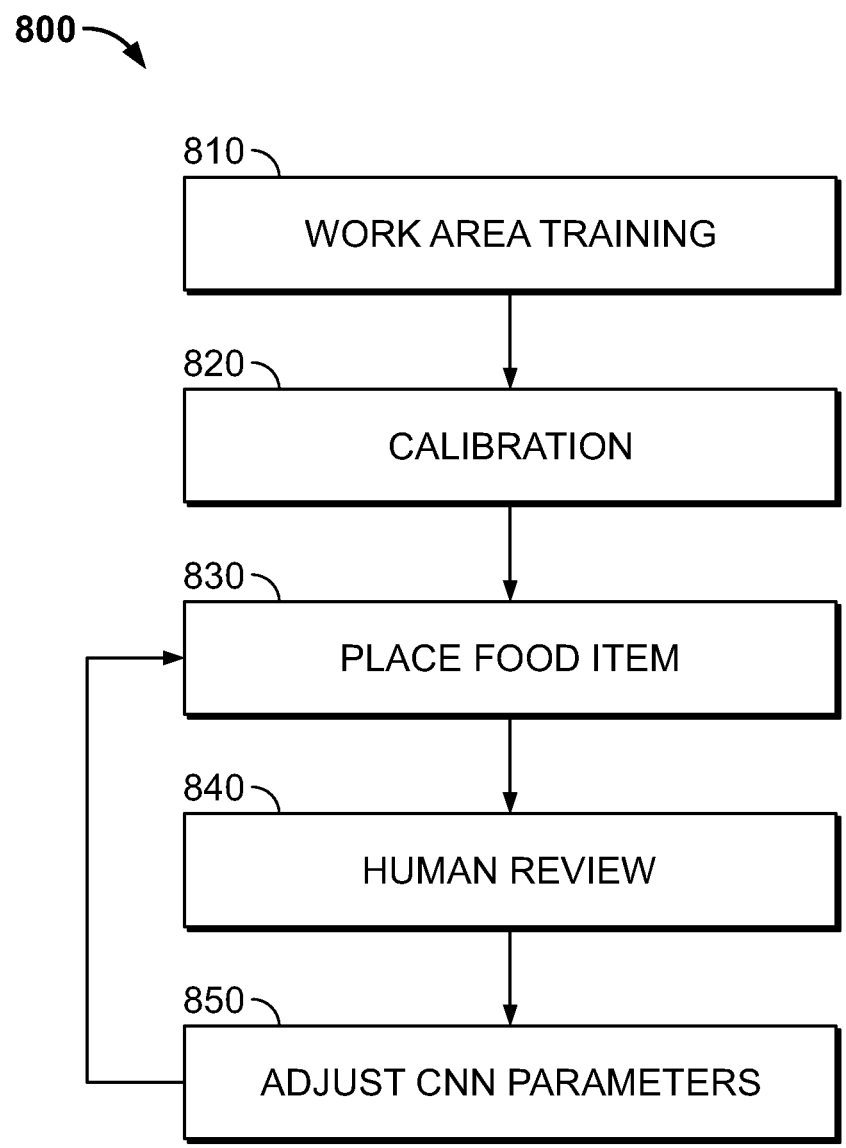
FIG. 8 is a flow diagram of a method for training a convolutional neural network in accordance with an embodiment of the invention.

FIG. 8 is a flow diagram of a method 800 for training a convolutional neural network in accordance with an embodiment of the invention.

First, sensors, including an IR sensor, are set up and trained onto the work area 810.

Second, with reference to step 820, the correct extrinsic and intrinsic calibration data are calculated and applied.

Third, with reference to step 830, relevant objects are placed in the work area and image input data is generated which comprises an image of multiple channels representing the intensity of light at various wavelengths (e.g., red, green, blue, IR) and depth.

Fourth, with reference to step 840, the image data or a portion of the image data is presented to a human user who identifies relevant objects in the image and creates bounding boxes for the images. The data from the human user is then recorded into the form of the output layer that the CNN should create when presented with the input image data.

Fifth, with reference to step 850, the input images and output layer are presented and the parameters of the CNN are adjusted. Exemplary techniques to tune the weights of the CNN include without limitation backpropagation and gradient descent. The process is repeated multiple times for each image that the CNN is being trained to identify. With each iteration, the weighting factors of the CNN are modified.

In embodiments, the output vector comprises multiple instances of known food items that are differentiated by the degree that they are cooked (namely, "degree of doneness"). In embodiments, the measure of cooking is the internal temperature of the object, such as a steak cooked to medium rare corresponding to an internal temperature of 130 to 135 degrees Fahrenheit. In embodiments, the CNN is trained to detect not just individual objects and their location, but the internal temperature of the objects. Measurements of the internal temperature of the food item can be taken with temperature sensors and used in the output vector for the training of the CNN. In some embodiments, these temperature measurements are taken dynamically by a thermocouple that is inserted into the food item.

In embodiments, an alternate or additional thermal model is used to track the estimated internal temperature of various food items to determine when they are cooked to the appropriate level. In these cases, data can be provided by the Kitchen Scene Understanding Engine on how long the various items have been cooked and their current surface temperature and or temperature history as measured by the IR camera.

Calibration

Preferably, each sensor is calibrated with a calibration target capable of obtaining known high signal-to-noise ratio observations in a known coordinate frame which may be translated into a 3D or world coordinate frame. In embodiments, and with reference to FIG. 9, a single calibration tool 900 is provided to calibrate the RGB, depth, and IR sensors simultaneously in the coordinate frame of the robot.

The calibration target or tool 900 is shown having a spatula-shaped body 910 that is attached to the end of the robotic arm 920. The calibration target may be comprised of a metal sheet 922 featuring a pattern of circles 924. The circles and planar surface, or backplane, have been engineered to provide high signal-to-noise ratio signals in both the RGB and IR spectrum. In addition, the surface of the calibration target is smooth, increasing the strength of the signal for the depth sensor.

In embodiments, the calibration target is comprised of a 4 by 5 pattern of equally-spaced black dots 924 on a surface with a white background. However, the size, number, spacing, and pattern may vary and include other patterns and shapes including symbols of symmetrical and asymmetrical nature.

The high contrast between the black dots and white background when measured in the visible spectrum provides a high-quality signal for the RGB camera. Additionally, the black dots are comprised of a high thermal emissivity material and the background is comprised of an insulating or low thermal emissivity material, resulting in a high contrast reading when imaged with an IR camera.

In embodiments, the tool 900 is manufactured by creating the disc-shaped holes 924, and subsequently filling the holes with a material having a color and emissivity different than that of the background 922.

Figure 10:
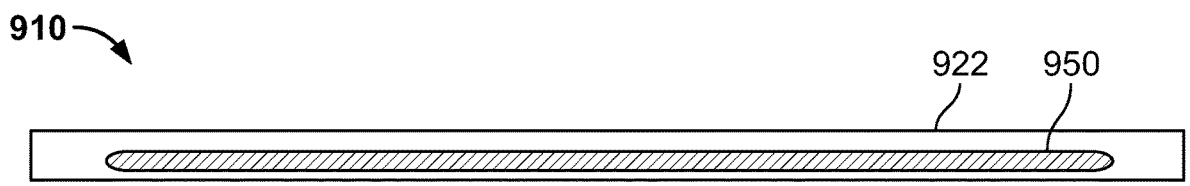
FIG. 10 is a cross sectional view of the tool shown in FIG. 9 taken along line 10-10.

With reference to FIG. 10, a resistive heating element 950 is shown in backplane of the sheet 922. When the resistive heating element 950 is activated, the calibration target 910 heats up and the surface of the calibration target presents a high contrast IR image, with the black dots generating significant emission because of their conductive nature and the white backplane generating limited emission because of its non-conductive nature.

To prevent non-uniformities from being generated by the resistive heating element 950, the calibration target can be warmed for a period using the heating element and then the power to the heating element is shut off. The calibration process can be performed while the temperature of the calibration target cools thereby minimizing potential non-uniformities in the IR image data caused by non-uniformities in the heating supplied by the resistive heating element and/or the fact that the resistive heating element may not uniformly cover the back surface of the backplane.

A method for performing calibration is described herein. Initially the calibration target 910 is mounted on a fixture that enables it to be attached as the end effector 916 of the robot arm 920.

Next, the calibration target is heated by applying power to the embedded resistive heating element. After that, the power to the heating element is turned off. The robotic arm then moves the calibration target around the workspace, capturing image data at multiple locations as measured in the coordinate frame of the robot and the various sensor images. At locations in the workspace where the calibration target is seen by all three sensors, calibration data is generated comprising image data from the sensors as measured in their respective imaging coordinate system and the measured XYZ position of the calibration target as measured by the robot arm. The location of the calibration target in the image data is determined as is known in the art using, for example, computer vision algorithms. The location along with the depth measured by the depth sensor at that point is then correlated to the measured XYZ position of the end effector. In this way, the three-dimensional position of the calibration target is registered to the two-dimensional information of the RGB and IR cameras and the measured depth information from the depth sensor.

The calibration method may vary. In some embodiments, for example, the tool attachment could be automated such as through the use of an automatic end effector changing system such as the QC 11 pneumatic tool changing system 916 illustrated in FIG. 9 manufactured by ATI (Apex, N.C.). In embodiments, the calibration target is heated through contact with the grill; and in other embodiments, the calibration tool is unheated.

The calibration tool 900 serves to provide known and overlapping, high signal-to-noise ratio observations suitable for RGB, depth, and IR sensors. The known and often overlapping nature of these images enables one to compute the position of each sensor data relative to the other sensors' data.

Other modifications and variations can be made to the disclosed embodiments without departing from the subject invention.

We claim:

1. A method of assisting in food preparation in a kitchen environment comprising:

inspecting a food preparation area in the kitchen environment containing at least one food preparation item or food item, wherein the step of inspecting is performed with an IR camera that generates IR image data, and a visible spectrum camera that generates RGB image data;

automatically computing, using a trained kitchen object recognition and tracking module, an output based on at least the RGB image data wherein the output comprises identity, confidence level of the identity, and location information for the at least one food preparation item or food item; and refining the location information provided from the trained kitchen object recognition and tracking module to increase accuracy of the identified at least one food preparation item or food item in a three dimensional coordinate frame by operating on the IR image data generated in the inspecting step, and wherein the refining step is performed subsequent to the automatically computing step.

2. The method of claim 1, further comprising determining a command to execute a food preparation step.

3. The method of claim 2, wherein the command is a food preparation process step selected from the group consisting of: removing a food item from a cooking surface; placing a food item on a cooking surface; flipping a food item; putting a food item into cooking equipment; putting a food item into food preparation equipment; taking a food item out of cooking equipment; and taking a food item out of food preparation equipment.

4. The method of claim 3, wherein the command is automatically performed by a robotic arm.

5. The method of claim 3, wherein the command is applicable only for a human worker to perform, and is communicated to a kitchen worker for execution.

6. The method of claim 1, wherein the step of inspecting further comprises using a third sensor to obtain third sensor image data.

7. The method of claim 6, wherein the third sensor senses depth to obtain depth image data and the step of automatically computing uses at least the depth and RGB image data to compute the output.

8. The method of claim 1, wherein the refining step operates exclusively on the IR image data to increase accuracy of the location information.

9. The method of claim 1 wherein the step of automatically computing is performed using a convolutional neural network trained to identify the at least one food preparation item or food item.

10. The method of claim 9, further comprising training the convolutional neural network to detect the extent a food item is cooked.

11. The method of claim 1, further comprising using the IR image data to detect the extent to which the food item is cooked.

12. The method of claim 1, wherein the IR image data and second sensor data is combined into combined image data.

13. The method of claim 1, further comprising installing the IR camera and RGB camera prior to the inspecting step.

14. The method of claim 2, further comprising repeating each of the steps of inspecting, computing, and determining without human intervention.

15. An automated food preparation system for preparing a food item comprises:

an IR camera configured to obtain IR image data;

a visible imaging sensor configured to obtain visible light image data; and a first processor operable to automatically initially compute, using a trained kitchen object recognition and tracking module, an output based on at least the visible light image data, wherein the output comprises information on the identity and location of the at least one food preparation item or food item within a region; and to improve the accuracy of the location of the identified at least one food preparation item or food item in a three dimensional coordinate frame by further processing the IR image data from the IR camera subsequent to computing the initial output.

16. The system of claim 15, wherein the first processor is operable to run a convolutional neural network to compute the output.

17. The system of claim 16, wherein the convolutional neural network is trained to detect the extent a food item is cooked.

18. The system of claim 15, wherein the output is used to compute a command for preparation of food items.

19. The system of claim 18, further comprising a display, and the command is provided to the display.

20. The system of claim 18, further comprising a robotic arm, wherein the command is provided to the robotic arm for executing the command.

21. The system of claim 15, wherein the IR image data and the visible light image data are combined to form a combined image data and wherein the step of automatically computing is based on the combined image data.

22. The system of claim 15, further comprising a third sensor configured to obtain third sensor image data and wherein the step of automatically computing is further based on the third image sensor data.

23. The system of claim 22, wherein the IR image data, visible light image data, and third sensor image data is combined to form a combined image data and wherein the step of automatically computing is based on the combined image data.

24. The system of claim 22, wherein the third sensor is a depth sensor.

25. The system of claim 18, further being operable to obtain the IR image data and the visible light image data, compute the output, and compute the command, multiple times, without human intervention.

26. The method of claim 2, wherein the command is executed by a robotic arm based on the refined location information of the IR image data.

* * * * *